UNITED STATES PATENT OFFICE.

CHARLES C. MOORE, OF LEXINGTON, KENTUCKY.

PROCESS OF PRODUCING STARCH AND GLUCOSE.

1,016,761. Specification of Letters Patent. Patented Feb. 6, 1912.

No Drawing. Application filed April 16, 1909. Serial No. 490,411.

*To all whom it may concern:*

Be it known that I, CHARLES C. MOORE, a citizen of the United States, residing at Lexington, in the county of Fayette and State of Kentucky, have invented certain new and useful Improvements in Processes of Producing Starch and Glucose, of which the following is a specification.

This invention relates to processes of producing starch and glucose; and it comprises a method of impregnating a mass of fresh starchy materials with sulfurous acid or a sulfite, thereafter advantageously drying the mass and subsequently preparing starch and glucose from the dried material; all as more fully hereinafter set forth and as claimed.

There are many cheap vegetable materials containing large amounts of an easily soluble convertible starchy matter and fiber which are not readily available for use in the arts because of the decomposibility of these materials. Cassava or manioc, for instance, is readily grown in tropical countries and yields a very large percentage of starch and convertible fiber per acre. It is however not very valuable as a commercial source of starch and glucose owing to the speed with which it spoils. The cassava root or tuber contains a number of very active enzyms, and as soon as the tuber is pulled or cut these enzyms begin to convert the starch into sugar, to soften the fiber, to produce oxidation products, and cause other effects of decomposition whose nature is not definitely ascertained as yet. Some of these enzyms have a diastatic power, others are cytolytic ferments, and still others are laccases or oxidizing ferments, etc. As a result of the conjoint activity of these ferments, the cassava root or tuber very soon after being pulled softens, blackens (probably because of the presence of the laccases), and quickly begins to rot, bacteria attacking the broken-down materials yielded by the enzyms. Practically the cassava root or tuber after being dug cannot be kept more than a day or so without great loss of its valuable constituents.

I have discovered that by comminuting the tuber as soon as possible after digging and treating it with enzym-killing substances, this spoiling and blackening of the tuber may be prevented. Many chemical substances may be used for this purpose, but sulfites and acid sulfites are cheap and convenient. Though not as positive enzym poisons as some other substances, they yet possess sufficient activity for this purpose, particularly when the treatment with the sulfite is followed by desiccation. And for the purpose of starch and glucose making, they exhibit specifically advantageous properties not shared by many other active enzym poisons and they are therefore particularly applicable for the present purposes.

The starch in the cassava root as well as in other fresh vegetable materials, is not all in the form of dense, thoroughly ripened, mature starch of the ordinary chemical properties, but is in part hydrated, the granules not having thoroughly formed. Whether this difference be due to a real difference in a chemical constitution of the starch or simply due to different stages of hydration of the starch, I am not sure and content myself with stating the fact that the starch in the fresh material is of different grades and degrees of density. As the ordinary methods of collecting starch depend practically altogether on the specific gravity or density of the starch, as in collecting starch on starch tables, the lighter or less dense portions of the starch granules are apt to go to waste, only the thoroughly ripened, heavy granules remaining in the pure starch collected. By first impregnating the starchy material, whether cassava or another starchy material, with a sulfite or sulfurous acid and subsequently drying to substantial completeness, the less dense starch granules are converted into a denser form and can be collected on the tables with the naturally dense starch granules, and the total yield of starch from the material is thereby much increased. By using sulfites or sulfurous acids as the enzym poison and thereafter drying the vegetable material, I therefore increase the yield of marketable starch. This fact is also true of fresh grain or many other starchy materials, though with grain an enzym poison is not required. As to the nature of the action of the acid sulfite or sulfurous acid on either the starch or the components of the vegetable tissue I am not aware. Most of these bodies however are of aldehydic or ketonic nature and so react more or less with sulfites. It may be that this ripening of the starch granules is due to some such action as this. Where the material is to be subsequently converted into glucose or sugary bodies, the presence of this sulfite, in the intimate union of the sulfites with the starch and other carbohydrates which takes place during the impregnation and drying, is particularly advantageous. As is well known starch and various other carbohydrates are converted by acid into the bodies known commercially as glucose. Conversion is generally done by sulfuric acid, hydrochloric acid, or other suitable strong acid. In this action of the strong acid upon the starch or other material, there is a tendency to discoloration and the formation of other bodies than the desired sugars, this being particularly the case where the starch employed contains the above mentioned imperfect or unripened starch granules. By the conversion of these starch granules into the matured form secured in this invention, this trouble is avoided, and furthermore with the sulfite impregnating the body of the starch granule, perhaps chemically combined therewith, the starch on mixing with the stronger acid liberates nascent sulfurous acid throughout this body which both precludes discoloration and assists in the hydrolysis to form sugars. An even more important practical result is attained in vegetable materials treated with sulfites in the manner described, since there is an increased yield due to the formation of sugars from non-starchy bodies of the nature of what are indefinitely called "hemi-celluloses."

In cassava as well as in other fresh vegetable materials there is a relatively large quantity of carbohydrates of unknown constitution, which are conveniently regarded as "hydrated cellulose" representing perhaps the cellulose molecule in an intermediate state of formation. At all events, upon simple desiccation these bodies are converted into dense resistant cellulose-like forms. These hemi-celluloses in the green state readily hydrolyze with acids to produce sugars, but after drying reaction is not so ready. If however the vegetable material be impregnated with sulfurous acid, sulfites or bisulfites prior to desiccation, these hydrated bodies retain their sensitiveness to acid even after desiccation. When therefore a material containing these hemi-celluloses and starch is treated with sulfite and dried, the dried material, like the fresh material will give sugars equivalent not only to the starch but to the hemi-celluloses. Apart from this utility as an enzym-poison in the case of cassava, sweet potato, and many other sensitive vegetable materials, sulfite has a number of other distinctive advantages for the present purpose. It is therefore to be preferred in treating cassava to other bodies, which though more active as enzym poisons, do not have the stated advantages.

In a specific embodiment of the present invention I may for instance take the fresh cassava root after digging, comminute it as by slicing or grating, thoroughly impregnate with a sulfite, which may be advantageously acid sulfite of calcium, and then dry. This drying may be sun drying, or drying may be done in any suitable apparatus. The material so dried may be preserved practically indefinitely. The sulfite serves to suspend the activity of the enzym during the desiccation and after the desiccation there is no possibility of their activity. In long preservation some of the sulfite in the exterior portion of the given piece of cassava may disappear to a greater or less extent but there will always be enough left within the body of the piece and combined with the various carbohydrates to effectually restrain the activity of the enzyms should the material become damp in storage. The sulfite is also of course a good preservative against mold or bacterial action. Upon now regrinding the dried sulfite-treated material with water, and separating the starch on tables or centrifugals, the starch is regained in a pure form and in enhanced quantity, as compared with yield in directly grinding, etc., the fresh material. Collection of the starch and purification may be done as usual.

In making starch for glucose a large portion of the fiber of the material may be allowed to remain with the starch; that is, the starch collected on the tables need not be collected so pure as is ordinarily the case, being allowed to retain the greater portion of the softer fiber of the material. As stated, the fiber after the sulfite treatment even after drying is quite largely available for making glucoses. The fiber and starch collected from the table may be taken directly for treatment with acid. In the described collection of fiber and starch on the tables, but little water need be employed and no great amount of the sulfite is lost, that which is combined with the carbohydrates and in the interior of the granule, fiber, etc., not washing out rapidly. On now treating this sulfite-containing starch and fiber with sulfuric acid or other strong acid, sulfurous acid is liberated within the body of the starch granule or the fiber, thus aiding in hydrolysis and in avoiding discoloration. If desired, the amount of the stronger acid employed may be equivalent to, or not much more than that required by the base of the sulfite, whereby reliance may be placed upon a hydrolytic action of the nascent sulfurous acid employed throughout the body of the material. In making glucose where glucose however alone is sought, it is simpler to take the sulfite-treated dried material direct and hydrolyze it with acid without a preliminary separation of the starch. In such a direct treatment the quantity of retained sulfite is of course greater than where the material has been washed on a starch table and its advantageous action is therefore greater. Furthermore, none of the treated hemi-celluloses formed in the described operation are lost, as they may be in the separation on the starch table, and consequently the total quantity of sugars obtained is enhanced. The comminuted material may be simply mixed with water and hydrolyzed with acid under pressure. Any of the usual methods of conversion may be employed. The beneficial effect of the thoroughly distributed combined sulfites in the mass, may of course be obtained where the sulfite-treated raw cassava is directly treated with acid to form glucose without the intermediate drying stage.

As cassava contains several per cent. of sugar in the juice, direct treatment either of the dried or the fresh cassava by glucose-making methods results in a larger yield of glucose as compared with the method where starch is first prepared on starch tables by water.

What I claim is:—

1. The process of treating sensitive vegetable materials which comprises impregnating the same in a comminuted state with an enzym poison and desiccating.

2. The process of treating sensitive vegetable materials which comprises impregnating the same in a comminuted state with a composition comprising $SO_2$ and desiccating.

3. The process of treating sensitive vegetable materials which comprises impregnating the same in a comminuted state with an enzym poison, desiccating and recovering starch.

4. The process of treating sensitive vegetable materials which comprises impregnating the same in a comminuted state with a composition comprising $SO_2$, desiccating and recovering starch.

5. The process of treating sensitive vegetable materials which comprises impregnating the same in a comminuted state with an enzym poison, desiccating, recovering starch together with convertible fiber and converting the recovered matters into glucose.

6. The process of treating sensitive vegetable materials which comprises impregnating the same in a comminuted state with a composition comprising $SO_2$, desiccating, recovering starch together with convertible fiber and converting the recovered matters into glucose.

7. The process of treating cassava which comprises comminuting the fresh tuber, impregnating with an enzym poison and desiccating.

8. The process of treating cassava which comprises comminuting the fresh tuber, impregnating with a composition comprising $SO_2$ and desiccating.

9. The process of treating cassava which comprises comminuting the fresh tuber, impregnating with an enzym poison, desiccating and recovering starch.

10. The process of treating cassava which comprises comminuting the fresh tuber, impregnating with a composition comprising $SO_2$, desiccating and recovering starch.

11. The process of treating cassava which comprises comminuting the fresh tuber, impregnating with an enzym poison, desiccating, recovering starch together with convertible fiber and converting the recovered matters into glucose.

12. The process of treating cassava which comprises comminuting the fresh tuber, impregnating with a composition comprising $SO_2$, desiccating, recovering starch together with convertible fiber and converting the recovered matters into glucose.

13. The process of treating cassava which comprises comminuting the fresh tuber, treating with an acid sulfite solution and drying to substantial completeness.

14. The process of treating cassava which comprises comminuting the fresh tuber, treating with an acid sulfite solution, drying to substantial completeness recovering hydrolyzable carbohydrates and thereafter converting such hydrolyzable carbohydrates into glucose.

15. The process of treating cassava which comprises comminuting the fresh tuber, treating with an acid sulfite solution, drying to substantial completeness, and recovering starch from the dried material.

16. The process of treating cassava which comprises comminuting the fresh tuber, treating with an acid sulfite solution, drying to substantial completeness, recovering starch together with convertible fiber from the dried material and converting such matters into glucose.

17. As a new article of manufacture, a substantially dry cassava containing acid sulfites, said dried cassava being unblackened, containing the same proportion of soluble sugars as fresh cassava, and upon treating by starch making processes yielding somewhat more starch than the original tuber.

In testimony whereof, I affix my signature in the presence of witnesses.

CHARLES C. MOORE.

Witnesses:
K. P. McELROY,
M. C. MASSIE.